INVENTORS
Theodore S. Dayton
BY Gordon V. Dayton

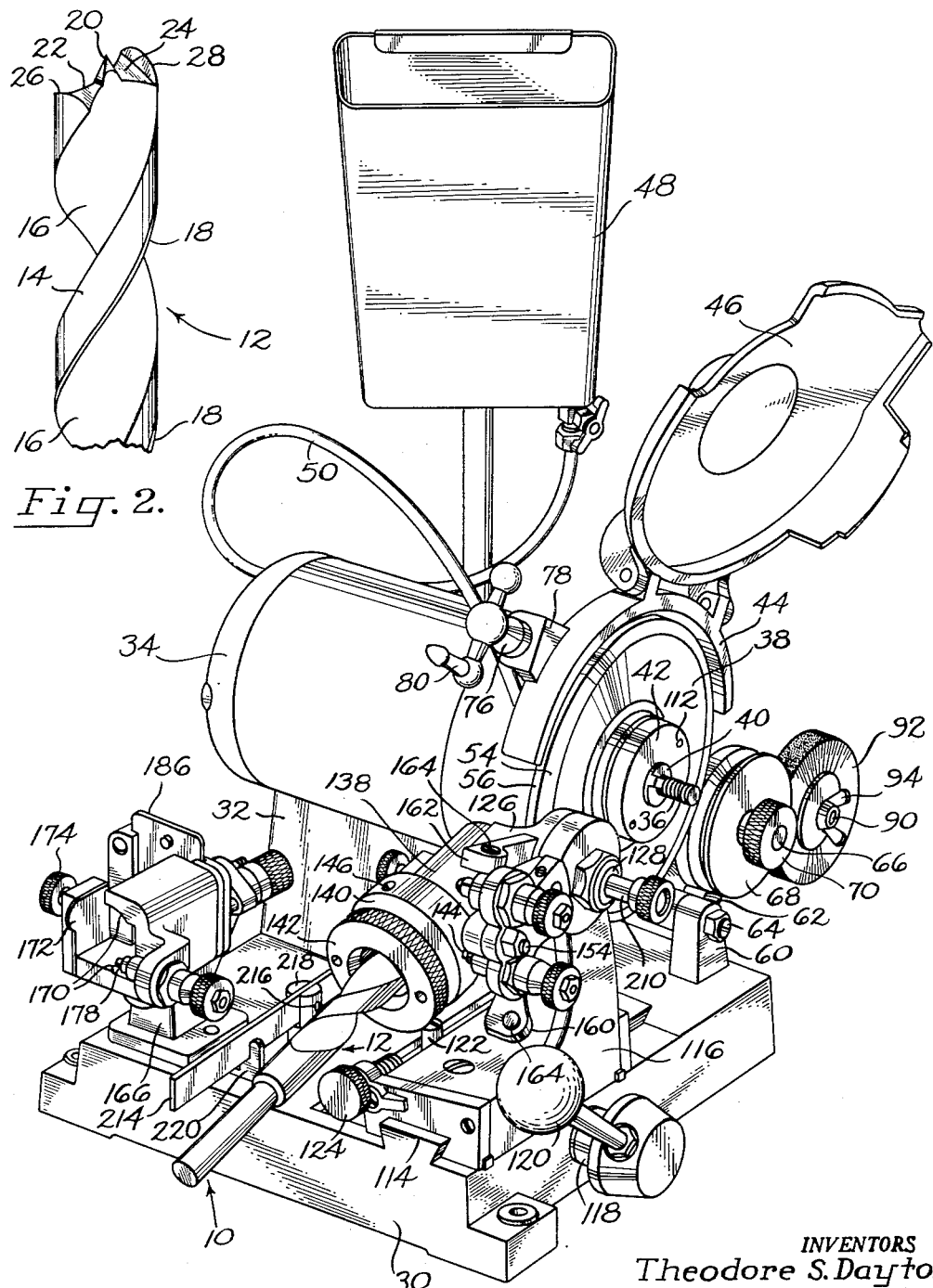

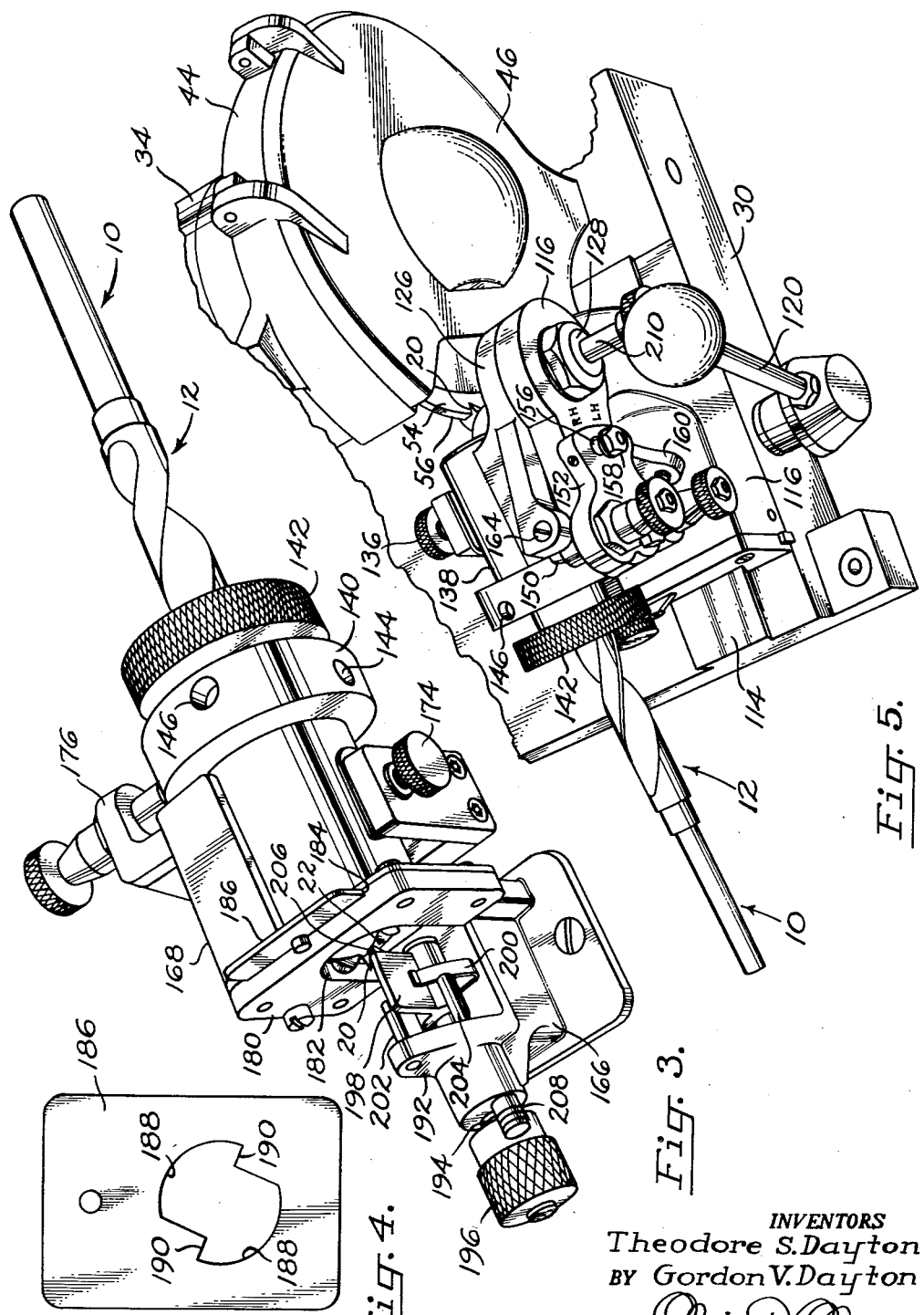

Agent

United States Patent Office 2,984,949
Patented May 23, 1961

2,984,949
APPARATUS FOR SHARPENING WOOD BITS

Theodore S. Dayton and Gordon V. Dayton, Portland, Oreg., assignors, by mesne assignments, to Pacific Tool and Manufacturing Co., Portland, Oreg., a corporation of Oregon Filed Sept. 9, 1957, Ser. No. 682,906

26 Claims. (Cl. 51—95)

This invention pertains to grinding apparatus, and relates particularly to apparatus for grinding and sharpening the internal cutting edges of wood bits, with speed and precision. The present invention constitutes an improvement in the apparatus for sharpening wood bits disclosed in the co-pending application of Theodore S. Dayton, Serial No. 468,608 filed November 15, 1954 and issued September 10, 1957 under U.S. Letters Patent No. 2,805,522.

The construction of bits or drills for cutting holes in wood or like materials is entirely different from the construction of bits or drills designed for cutting holes in metal. Metal drilling bits are provided with a conical tip having cutting edges formed on the outer periphery thereof, thereby rendering the grinding or sharpening of these exposed cutting edges a relatively simple matter. For example, metal drilling bits of the twist drill type are readily sharpened by positioning the outer cutting surfaces in contact with the flat surface of a conventional grinding wheel. The positioning of the bit may be accomplished by hand or by special apparatus designed to support the bit in proper position.

On the other hand, bits of the wood drilling type are provided with cutting edges which are recessed inwardly between a central spur and opposed peripheral cutting lips, the central spur functioning to center the drill and the peripheral cutting lips functioning to sever the wood fibers at the periphery of the hole being cut, preliminary to the removal of wood by the internal recessed chisel edges. The construction of a wood bit therefore renders more difficult the precise grinding and sharpening of the cutting edges, as compared with the aforementioned twist drill construction, since the cutting edges of a wood bit are formed internally, rather than on the external surface. The sharpening of wood bits is further complicated by the fact that proper angular relationship between the chisel edges, the peripheral cutting lips and the central spur must be maintained, and the cutting edges also must be oriented properly with respect to the helical contour of the drill.

It is a principal object of the present invention to provide apparatus for grinding and sharpening the internal cutting edges of wood bits with precision and facility.

Another important object of the present invention is to provide apparatus for grinding and sharpening the cutting edges of wood bits, wherein the bit is ground in quadrants and all the internal surfaces of each quadrant are ground simultaneously to proper contour.

A further important object of this invention is the provision of apparatus for grinding and sharpening wood bits, wherein the internal cutting edges formed upon completion of the grinding and sharpening operation are oriented properly with respect to the helical contour of the drill flutes.

Still another important object of the present invention is the provision of apparatus for grinding and sharpening wood bits of a variety of sizes and makes, as well as wood bits of the right-hand and left-hand types.

A still further important object of this invention is to provide apparatus for grinding and sharpening wood bits, which apparatus is of simplified construction for economical manufacture, which is operable with facility and precision and which requires a minimum of maintenance and repair.

The foregoing and other objects and advantages of the present invention will appear from the following detailed description, taken in connection with the accompanying drawings, in which:

Figure 1 is a perspective view of grinding and sharpening apparatus embodying the features of the present invention, the parts thereof being shown positioned for grinding one major quadrant of a right-hand wood bit;

Figure 2 is a perspective view of a wood bit, showing the internal cutting surfaces thereof;

Figure 3 is a fragmentary perspective view of the setting fixture by which a wood bit is properly oriented in its holder for cooperative registration with the grinding instrument;

Figure 4 is a plan view of a template forming a part of the setting fixture shown in Figure 3;

Figure 5 is a fragmentary perspective view of a mounting fixture and grinding instrument, the same being shown in position supporting a pre-oriented right-hand wood bit against the grinding instrument;

Figure 7:
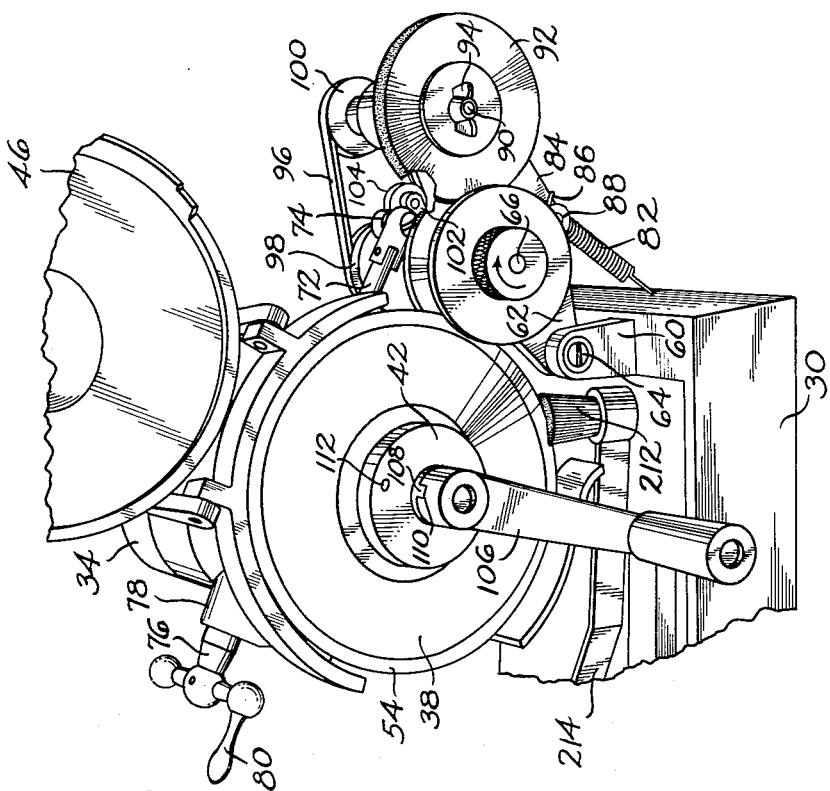
Figure 7 is a fragmentary perspective view of a dressing fixture by which to contour the periphery of a grinding wheel to match the profile of one major quadrant of a wood bit.
Figure 6:
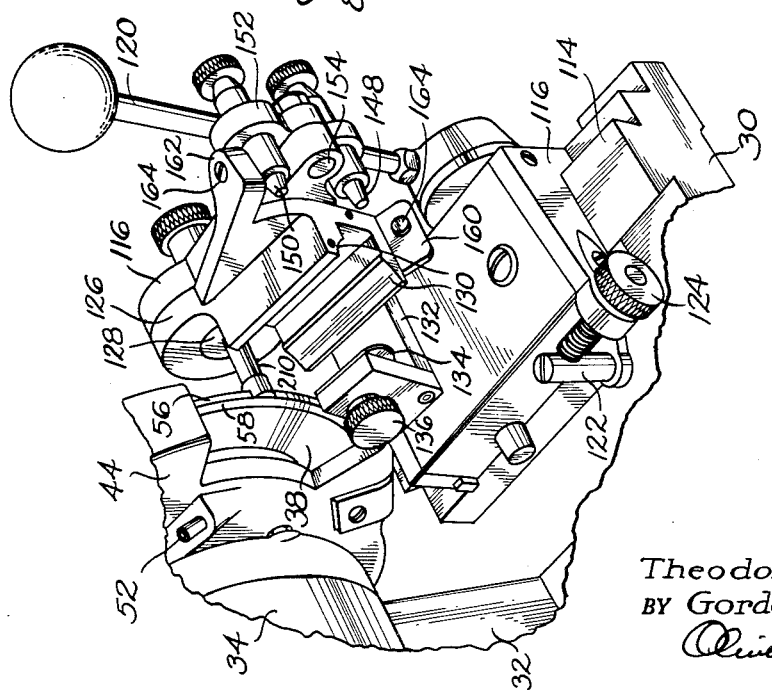
Figure 6 is a fragmentary perspective view of the mounting fixture with the wood bit and chuck removed, showing the manner in which the forward limit adjustment is made.

Referring particularly to Figure 2 of the drawings, there is shown one form of conventional bit having a rearward shank section 10 and a forward cutting section 12 of helical form, terminating in a cutting tip. The forward cutting section is formed as helical body 14 defined by opposed flutes 16, and the body is hollow ground along a portion of its periphery to form the raised lands 18 which function as cutting edges. The forward cutting tip is provided with a central projecting spur 20, intermediate chisel surfaces 22, 24 on opposite sides of the spur, and the peripheral cutting lips 26, 28 which project forwardly from the outer sides of the recessed chisel surfaces. Thus, the tip includes two opposed major quadrants consisting of the adjacent surfaces 20, 22, 26 and 20, 24, 28 respectively, and two opposed minor quadrants consisting of the remaining side surfaces of the spur. In profile across the major quadrants the bit tip consists of opposed halves defined by the surfaces of the major quadrants.

The central spur extends forwardly a distance greater than the cutting lips, whereby to first penetrate the wood and stabilize the bit. The cutting lips project forwardly a distance greater than the cutting edges of the chisel surfaces, whereby to cut the fibers of wood defining the periphery of the hole to be drilled, preliminary to removal of the wood within said periphery by the action of the chisel edges. It is to be noted that the chisel surfaces taper rearwardly, i.e. in the direction opposite the direction of rotation of the bit, from their cutting edges to enhance the cutting operation. The degree of taper of the chisel surfaces may be varied within rather wide limits. In general, the greater the degree of taper, the faster will be the cutting action of the bit.

The grinding apparatus includes a base 30 upon which the elements of the apparatus are supported. A pedestal 32 is mounted on the base to support a motor 34, preferably electric, the drive shaft 36 of which is threaded at its outer end and functions to support a rotary grinding wheel 38, preferably upon a fast taper sleeve 40 threaded upon the drive shaft. A threaded nut 42 is receivable on the outer threaded end of the sleeve to secure the grinding wheel firmly thereon.

An arcuate shield 44 and a cover plate 46 hinged thereto function to enclose a major proportion of the grinding wheel, to insure against accident from flying particles of metal or grinding wheel during the grinding operation. A reservoir 48 is connected through conduit 50 to an inlet opening 52 in the shield for admitting cooling liquid to the hub of the grinding wheel. The liquid passes through the porous grinding wheel by centrifugal force to the periphery thereof, to cool the bit during grinding.

The grinding wheel 38 is contoured to the profile of one half of the wood bit cutting tip, i.e. the internal shape defined by the adjacent surfaces of each of the two major quadrants of the bit, including the central spur, chisel surface and peripheral cutting lip. Thus, the grinding wheel is contoured to provide an outer edge 54 conforming to the taper of the central spur, an intermediate peripheral edge 56 contoured to the shape of the chisel surface, and an inner edge 58 contoured to the inner surface of the peripheral cutting lip. By properly positioning the wood bit with respect to the grinding wheel, as explained in detail hereinafter, the latter effects simultaneous grinding and sharpening of all of said adjacent surfaces of each major quadrant.

Means preferably is incorporated in the apparatus for initially forming and subsequently maintaining the peripheral contour of the grinding wheel. In the embodiment illustrated this means includes an upstanding pedestal 60 upon which the bracket 62 is pivotally supported by means of a pivot pin 64. A shaft 66 mounted on this bracket functions to support a crusher roll 68 which is mounted releasably thereon by means of the nut 70, releasably threaded on the shaft. The crusher roll comprises a metal ring which is formed with a peripheral groove contoured to the desired shape to be formed on the periphery of the grinding wheel.

The pivoted bracket 62 is supported for adjustment toward and away from the grinding wheel, by means of a shaft 72, which is secured at one end to the bracket by means of the pivot connection 74. The shaft is threaded into an elongated internally threaded sleeve 76 which is supported for rotation in brackets 78 formed on the grinding wheel shield 44, and the outer end of the sleeve is fitted with a hand knob 80 by which to facilitate its rotation and consequent adjustment of the crusher roll with respect to the grinding wheel. A spring 82 interconnects the bracket 62 and base 30 and functions to urge the crusher roll away from the grinding wheel, to insure positive adjustment by the hand knob.

A second bracket 84 is mounted pivotally on a projection of the first named bracket 62, by means of pivot shaft 88. A coil spring 86 encircles shaft 88 and interconnects it and bracket 84, to urge the latter into counterclockwise rotation (Figure 7). The bracket 84 supports a shaft 90 upon which a rotary brush 92 is removably secured, by means of a wing nut 94. The two shafts 66 and 90 are interconnected by means of the belt 96 reeved over pulleys 98 and 100, respectively. The shaft 88 carries an arm 102 on which is mounted an idler pulley 104, positioned intermediate the pulleys 98, 100 and functioning to maintain the belt 96 tightened. The bracket 84 supporting the rotary brush is so arranged that it may be rotated about its pivot 88, in the clockwise direction of Figure 7, against the tension of the coil spring 86, to separate the brush and crusher roll, whereby to facilitate removal and replacement of the crusher roll. During such separation the pulleys 98, 100 are moved apart and the idler pulley 104 is elevated against the tension of spring 86, as the belt 96 elongates.

The grinding wheel is contoured by the crusher roll preferably by rotating the grinding wheel by hand while the crusher roll is in contact therewith. To this end there is provided a crank 106 which is adapted to be secured releasably to the nut 42 by means of the interengaging lug 108 and notch 110 provided on the sleeve 40 and crank, respectively, and by engaging a pin on the crank with an opening 112 in the sleeve. By rotating the crank and simultaneously drawing the crusher roll toward the grinding wheel, by means of the hand knob 80, the surface of the grinding wheel is contoured to the shape of the internal peripheral groove in the crusher roll. Simultaneous rotation of the crusher roll with the grinding wheel causes rotation of the brush 92 which maintains the crusher roll groove clean.

It will be understood that the crusher roll assembly may be provided as a separate mechanism. The arrangement illustrated is preferred, however, because it enables the dressing of a grinding wheel while in use on the motor drive shaft 36, thereby overcoming the necessity of removing the wheel for treatment by additional equipment. The arrangement also insures against errors in contours being transferred from the grinding wheel to a wood bit, since the grinding wheel is retained on the same rotary shaft for both dressing and grinding.

Means is provided for supporting a wood bit in proper relation with respect to the grinding wheel, for grinding and sharpening by the latter. In the embodiment illustrated, the base 30 supports an elongated key way 114 which extends in a direction parallel to the plane of the grinding wheel 38. A carriage 116 is provided with a complementary key groove adapted to receive the key way therein, to afford reciprocation of the carriage in the longitudinal direction of the key way. Such movement is effected, in the embodiment illustrated, by means of a conventional rack and pinion assembly. The rack is supported within the hollow portion of the carriage, above the key way, and the pinion communicates therewith through an opening in the key way. The pinion is connected to a shaft 118 mounted rotatably in the base and operable by means of the hand lever 120.

The forward movement of the carriage on the key way is limited by such means as the stop 122 projecting from the base 30 to intercept a threaded abutment screw 124 which is supported adjustably in a side extension of the carriage.

The upper end of the carriage pivotally supports a chuck holder 126, by means of the hollow pivot 128. In the embodiment illustrated, the chuck holder includes a pair of vertically spaced flanges each forming an arcuate elongated seat 130, and a laterally extending bracket 132 which is provided with an adjustable clamp 134, operated by the threaded screw 136. The seats and clamp are spaced apart circumferentially 120°, to provide a firm support for the cylindrical collet chuck.

The collet chuck includes a hollow cylindrical sleeve 138 having a radially projecting flange 140 on its rearward end, and is internally threaded at its rearward end to receive the externally threaded hollow bushing 142. These details, together with the internal arrangement of the sleeve for supporting a collet, are described in detail in the co-pending application referred to hereinbefore. The sleeve 138 is adapted to be positioned within the chuck holder 126, bearing against the seats 130 and clamp 134 and secured therein by means of the adjustable screw 136.

The radial flange 140 on the sleeve is provided with two pairs of indexing detents. The indexing detents 144 constituting one pair are positioned diametrically opposite each other, while the indexing detents 146 of the other pair are similarly positioned diametrically opposite each other, but disposed 90° from the indexing detents 144 of the first named pair. In addition, one of the pairs 144 of indexing detents is positioned on the radial flange axially forward from the other pair 146, for purposes explained in detail hereinafter.

Associated with the indexing detents on the collet chuck are indexing pins 148, 150 supported upon an indexing plate 152. The indexing plate is mounted pivotally on the carriage by means of pivot pin 154, and the degree of pivot is confined within the limits of the slot 156 formed in the indexing plate. A threaded screw 158 extends through the slot and is anchored in the carriage, and functions to secure the indexing plate in any position of adjustment. The indexing pins are mounted in the indexing plate for lateral extension and retraction, by means of the finger knobs illustrated, and each is spring loaded in conventional manner such that they are normally urged to their positions of extension.

The indexing pins are spaced on opposite sides of the pivot 154 for the indexing plate 152, and are so arranged that when the indexing plate is pivoted to its extreme counterclockwise position of rotation in the slot (Figure 5), the lower index pin 148 registers with the forward pair of indexing detents 144 when the chuck holder 126 is rotated to its extreme counterclockwise position, and the upper indexing pin 150 registers with the rearward pair of indexing detents 146 when the chuck holder is rotated to its extreme clockwise position. On the other hand, when the indexing plate is pivoted to its extreme clockwise position of rotation in the slot 156, the foregoing registration of indexing pins and detents is reversed, i.e. the lower indexing pin 148 registers with the rearward pair of indexing detents 146 and the upper indexing pin 150 registers with the forward pair of indexing detents 144, when the chuck holder 126 is rotated to its extreme counterclockwise and clockwise positions, respectively. This arrangement provides for proper orientation of the four quadrants of the bit tip with respect to the grinding wheel, for either right or left-hand bits, as explained more fully hereinafer.

The chuck holder 126 is provided witth a pair of laterally extending ears 160, 162, each provided with an adjustable stop, as by means of the adjustable screw 164, arranged to abut against the sleeves supporting the indexing pins 148, 150 respectively. Thus, the chuck holder is pivotable about its pivot 128, between an extreme downward position wherein the adjustable screw abuts against the sleeve of the upper indexing pin 150, and an extreme upward position wherein the adjustable screw abuts against the sleeve of the lower indexing pin 148. In the position illustrated in the drawings, the chuck holder is rotated to its downward position and the indexing plate is rotated upward, wherein pin 148 registers with detents 144 and the chuck is properly oriented for presenting the major quadrants of a right-hand wood bit to the grinding wheel. By rotating the chuck holder to its extreme upward limit and engaging pin 150 in detents 146, the minor quadrants of a right-hand wood bit are properly oriented with respect to the grinding wheel. On the other hand, in order to grind and sharpen a left-hand wood bit, the foregoing procedure is reversed. Thus, the indexing plate 152 is rotated clockwise about its pivot to the limit defined by the slot 156, and the major quadrants of the left-hand wood bit become properly oriented with respect to the grinding wheel when the chuck holder is in its upwarrd position of rotation, and the minor quadrants of the left-hand wood bit are properly oriented when the chuck holder is rotated to its lower position.

From the foregoing it will be appreciated that since the indexing detents are positioned in the chuck holder in fixed relation to the peripheral surface of the grinding wheel, there must be proper orientation of the cutting edges of the wood bit with respect to the indexing detents on the chuck flange 140. In the co-pending application referred to hereinbefore, such orientation is maintained continuously during the grinding operation, i.e. the chuck holding the bit is rotated continuously on the helical path of the bit flutes as the bit is fed toward the grinding wheel, so as to insure that the cutting edges thus ground onto the bit always follow the helical construction of the bit. In the present invention, on the other hand, means is provided by which the cutting edges formed on the bit are properly oriented with respect to the helical construction of the bit upon completion of the grinding operation. That is, although at the start of the grinding operation the bit is presented to the grinding wheel in such manner that the cutting edges are initially ground into the bit improperly oriented with respect to the helical contour of the bit, but they are properly oriented upon completion of the grinding operation, i.e. after a predetermined length of the bit has been ground away to form the cutting edges. In accordance with this mode of operation, means is provided for orienting the bit in the collet chuck with respect to the indexing detents.

Referring particularly to Figure 3 of the drawings, there is provided a bit setting fixture which includes a pedestal 166 mounted upon the base 30 and supporting a fixed collet chuck holder 168 provided with the arrangement of spaced seats 170, clamp 172 and securing screw 174, as described hereinbefore in connection with the pivoted chuck holder 126. The chuck holder sleeve 138 is adapted to be secured within the chuck holder of the setting fixture in similar manner. A bracket 176 extending from the chuck holder 168 supports a spring loaded index pin 178 which is adapted to register with and seat in either one of the diametrically opposed indexing detents 144 of the forward pair.

The forward end wall 180 of the holder 168 is provided with an aperture 182 through which the forward end of a wood bit may project. This forward end wall also is provided with a vertical groove 184 adapted to releasably receive a wood bit template 186. The template is provided with a transverse opening in the form of diametrically opposed circular segments 188 which are interrupted by sections of the template which form diametrically opposed shoulder 190. Thus, the opening in the template is adapted to receive therethrough a range of sizes of wood bits, the largest size being determined by the diameter of the circular segments of the template opening and the smallest size being slightly larger than the distance between the shoulders 190. The shoulders are adapted to engage the diametrically opposed edges of a wood bit defined by the helical flutes, as explained more fully hereinafter.

Rearwardly of the wall 180 the setting fixture base supports an upstanding bracket 192 which is provided with an internally threaded bore having an axis extending parallel to the longitudinal axis of the setting fixture holder. A threaded screw 194 is mounted in the threaded bore for longitudinal adjustment therein, by means of the knob 196. The end of the screw positioned between the bracket 192 and the wall 180 supports a blade 198 rotatably therein. A leaf spring 200 interconnects the blade and base to urge the blade resiliently toward counterclockwise rotation (Figure 3), the limit of such rotation being restricted by means of the projecting pins 202 and 204 on the bracket. Pin 202 intercepts the blade at a point just to the right of the longitudinal axis of the setting fixture holder. In this manner the central spur of a wood bit may pass along the left side of the blade and thus guide the blade into contact with the forward edge of the chisel surface immediately adjacent the spur. The edge of the blade adjacent the bit preferably is provided with a beveled projection 206 which terminates at a point adjacent the bit axis.

The distance between the forward indexing detents 144 and the bit-engaging edge of the blade 196, which is variable by means of the screw 194, is greater than the minimum distance between said indexing detents 144 and the peripheral surface of the grinding wheel 38 when the collet chuck is mounted in the pivoted holder 126 and the carriage is moved to its forward limit. The difference between these distances equals the length of bit to be ground away from the bit tip. It will be understood that as the screw 194 is rotated in the bracket 192, the blade 198 is moved away from or toward the front wall 180 of the chuck holder 168. In this manner more or less of the front end of a wood bit is extended through the front end of the chuck, and hence more or less of the front end of the bit will be ground away by the grinding wheel. A graduated scale 208 may be mounted on the bracket 192 for registration with an index mark, for example the inner edge of the knob 196, to indicate the setting of the blade and hence the depth to which the bit is to be ground.

In order for the foregoing distance relationship to be effective, means must be provided to maintain a fixed minimum distance between the detents 144 and the periphery of the grinding wheel, as the latter is reduced in diameter during use and as different wheels are replaced. In the embodiment illustrated in the drawings, such means is provided by the retractable pin 210 which extends through the hollow pivot 128 of the holder 126. The contacting end of the pin is arranged, when extended, to abut against the peripheral surface of a freshly contoured grinding wheel when the carriage is moved forwardly. The threaded abutment screw 124 then is adjusted to engage the stop 122, after which the pin 210 is retracted. It is to be understood that this forward limit of movement of the carriage corresponds with the final depth to which a wood bit is to be ground, the total length of bit to be ground off depending upon the initial setting of the blade 198 in the bit setting fixture.

Grinding of the bits is achieved by bringing the latter into contact with the grinding wheel as the latter is rotated by the motor 34. In order to maintain the cutting surfaces of the grinding wheel perfectly clean during grinding, a brush 212 is arranged for retractable engagement therewith. In the embodiment illustrated the brush is supported upon the forward end of an arm 214 which is mounted intermediate its ends on a horizontal pivot 216 carried by a vertical swivel 218 supported on the base 30. The rearward end of the arm is confined between the lateral sides of a bracket 220 provided with vertically stepped notches. A spring interconnects the arm and base to urge the brush 212 normally upward for contact with the grinding wheel.

The operation of the apparatus described hereinbefore is as follows: A grinding wheel 38 corresponding to the size of wood bit to be ground, is installed upon the motor drive shaft 36, and appropriate crusher roll 68 brought into contact therewith by hand knob 80 as the hand crank 106 is rotated. The grinding wheel thereby is dressed to a contour designed to match the profile of each half of the bit tip, corresponding to the major quadrants of the cutting tip. During hand rotation of the grinding wheel and dressing of the latter by the crusher roll, the fragments of the grinding wheel adhering to the crusher roll are swept away by the brush 92, to insure precise contouring of the grinding wheel. During this operation the brush 212 is retracted laterally inward from under the grinding wheel by proper manipulation of the handle 214. Thereafter, the hand crank 106 is removed, the cover shield 46 is swung downwardly to conceal the major portion of the grinding wheel, and the brush 212 is swung laterally outward and upward into contact with the surface of the grinding wheel.

The forward limit abutment screw 124 then is backed off, the limit pin 210 extended and the carriage 116 moved forwardly by lever 120 until the limit pin engages the periphery of the grinding wheel. The forward limit abutment screw then is adjusted into engagement with the stop 122, and the limit pin 210 retracted.

The collet chuck now is mounted in the setting fixture, with the sleeve 138 supported loosely against the seats 170 and clamp 172. The sleeve is rotated until one of the pair of forward indexing detents 144 registers with and receives therein the indexing pin 178 of the setting fixture. Thereafter, the screw 174 is tightened to secure the sleeve firmly to the holder 168. The collet chuck bushing 142 is loosened to permit entrance of the desired wood bit therethrough, the appropriate template 186, corresponding with the size of bit to be ground, then is inserted in the vertical groove of the forward wall 180, and the blade 198 adjusted longitudinally for the desired depth to which the bit is to be ground.

The wood bit then is moved forwardly through the collet chuck and through the template opening, and is rotated until its flute edges abut against the shoulders 190 of the template opening. In this regard, it is to be noted that if the wood bit is of the right-hand type, it is rotated in the right hand direction until the flute edges abut the template shoulders. On the other hand, if the bit is of the left-hand type, the template is turned around, face for face, before installing in the holder groove, and the bit rotated in the left hand direction to bring the flute edges into engagement with the template shoulders.

With the flute edges engaging the template shoulders, the bit is moved still further forward, during which the central spur 20 guides the blade point 206 into contact with the adjacent edge of the chisel surface. The chuck bushing 142 then is tightened, whereupon the bit is secured firmly to the chuck by means of the internal collet. The chuck then is removed from the setting fixture by loosening the clamp screw 174 and retracting the indexing pin 178.

The assembly of the collet chuck and secured bit now is transferred to the pivoted holder 126 of the grinding fixture. Assuming that the bit is of the right-hand type, the indexing plate 152 is secured by the screw 158 at its extreme limit of counterclockwise rotation. The chuck is placed within the holder against the seats 130 and clamp 134, with the holder pivoted to its downward position. The chuck then is rotated until one of the detents 144 of the forward pair registers with and receives therein the lower indexing pin 148. The clamp screw 136 then is tightened to secure the collet chuck to the pivoted holder.

The feed carriage 116 now is moved forwardly by manipulation of the hand lever 120, bringing the forward end of one of the major quadrants of the bit into contact with the grinding wheel 38. Since the longitudinal axis of the bit is thus arranged obliquely with respect to the tangent of the grinding wheel at their point of intersection, the chisel surface of the major quadrant will be ground on a taper which extends rearwardly from its cutting edge in the direction opposite the direction of rotation of the bit.

As explained hereinbefore, although upon initial contact the grinding wheel does not form cutting edges on the bit which are properly oriented with respect to the flutes and lands, said cutting edges are properly oriented when the feed carriage has reached its forward limit of movement, with abutment screw 124 engaging the stop 122. This result is achieved by virtue of the initial setting of the bit in the setting fixture as previously explained.

The feed carriage now is retracted, the clamp screw 136 loosened, the lower indexing pin 148 retracted and the chuck rotated 180° to bring the other of said forward pair of indexing detents 144 into registry with the lower indexing pin. The clamp screw then is secured and the feed carriage moved forwardly to its forward limit, whereupon the opposite major quadrant of the bit will have been ground to the precise depth and contour of the first major quadrant.

The feed carriage again is retracted, the lower indexing pin retracted and the chuck holder 126 pivoted to its upper limit. The clamp screw is loosened and the chuck rotated 90° until one of the indexing detents 146 of the rearward pair registers with and receives the upper indexing pin 150. The clamp screw then is secured and the feed carriage moved to its forward limit, whereupon one of the minor quadrants of the bit is ground to the proper depth and contour, with respect to the previously ground major quadrants.

By so rotating the holder 126 upwardly the bit is presented to the grinding wheel in such manner that the cutting lips 26, 28 clear the grinding wheel during grinding of the minor quadrant of the spur.

The feed carriage again is retracted, the clamp screw 136 loosened, the upper indexing pin 150 retracted and the chuck rotated 180° to bring the other indexing detent 146 of the rearward pair into registry with the upper indexing pin. Upon securing of the clamp screw and movement of the feed carriage to its forward limit, the other of the minor quadrants of the bit tip will have been ground to the depth and contour matching the other quadrants. The ground and sharpened bit then may be retracted from the chuck by loosening the bushing 142.

The foregoing procedure is modified for bits of the left-hand type, only in the following respects: The indexing plate 152 is secured at its extreme limit of clockwise rotation in the slot 156 by means of the screw 158, and the major quadrants of the bit are ground when the pivoted holder 126 is in its upper position and the upper indexing pin 150 engages the forward pair of indexing detents 144. The minor quadrants of the left-hand bit are ground by moving the holder to its lower position and engaging the lower indexing pin 148 in the rearward pair of indexing detents 146.

It will be apparent to those skilled in the art that various changes may be made in the details of construction described hereinbefore without departing from the scope and spirit of this invention. Accordingly, it is to be understood that the foregoing description is primarily illustrative of the invention and is not to be considered as limiting the scope thereof.

Having now described our invention and the manner in which the same may be used, what we claim as new and desire to secure by Letters Patent is:

1. The method of grinding wood bits having a cutting end including a central forwardly projecting spur, a pair of diametrically opposed radially extending chisel surfaces depressed from the spur, and peripheral cutting lips projecting forwardly from the outer sides of the chisel surfaces, said method comprising: providing a rotary grinding wheel with a peripheral contour matching the profile of one-half of the cutting end of the bit, which profile is defined by the adjacent surfaces of the spur, chisel surface and cutting lip, positioning the bit and grinding wheel relative to each other with one of said halves of the cutting end disposed for registration with the matching surface of the grinding wheel in such manner that the cutting surfaces to be formed on the bit will be oriented properly on the bit upon completion of grinding the bit to a predetermined depth, and with the longitudinal axis of the bit fixed obliquely with respect to the tangent of the grinding wheel at their point of intersection and in the direction to taper the chisel surface rearwardly from the cutting end opposite the direction of rotation of the bit, moving the bit and grinding wheel relative to each other to bring said half of the cutting end of the bit into contact with the grinding wheel whereby to grind said half to said predetermined depth, separating the bit and grinding wheel, positioning the bit and grinding wheel relative to each other with the other of said halves of the cutting end disposed for registration with the matching surface of the grinding wheel in such manner that the cutting surfaces to be formed on the bit will be oriented properly on the bit upon completion of grinding the bit to said predetermined depth, and with the longitudinal axis of the bit fixed obliquely with respect to the tangent of the grinding wheel at their point of intersection and in the direction to taper the chisel surface rearwardly from the cutting end in the direction opposite the direction of rotation of the bit, moving the bit and grinding wheel relative to each other to bring said half of the cutting end of the bit into contact with the grinding wheel whereby to grind said half to said predetermined depth.

2. The method of claim 1 including the additional steps of separating the bit and grinding wheel, positioning the bit and grinding wheel relative to each other with the longitudinal axis of the bit disposed obliquely with respect to the tangent of the grinding wheel at their point of intersection and in the direction to clear the cutting lips from the grinding wheel during grinding of the remaining quadrants of the center spur, moving the bit and grinding wheel relative to each other to engage and grind one of said quadrants of the center spur with the grinding wheel, separating the bit and grinding wheel, positioning the bit and grinding wheel relative to each other with the longitudinal axis of the bit disposed obliquely with respect to the tangent of the grinding wheel at their point of intersection and in the direction to clear the cutting lips from the grinding wheel during grinding of the remaining quadrant of the center spur, and moving the bit and grinding wheel relative to each other to engage and grind the remaining one of said quadrants of the center spur with the grinding wheel.

3. The method of grinding wood bits having a cutting end including a central forwardly projecting spur, a pair of diametrically opposed radially extending chisel surfaces depressed from the spur, and peripheral cutting lips projecting forwardly from the outer sides of the chisel surfaces, said method comprising: providing a rotary grinding wheel with a peripheral contour matching the profile of one-half of the cutting end of the bit, which profile is defined by the adjacent surfaces of the spur, chisel surface and cutting lip, positioning the bit and grinding wheel relative to each other with one of said halves of the cutting end disposed for registration with the matching surfaces of the grinding wheel in such manner that the cutting surfaces to be formed on the bit will be oriented properly on the bit upon completion of grinding the bit to a predetermined depth, and with the longitudinal axis of the bit fixed obliquely with respect to the tangent of the grinding wheel at their point of intersection and in the direction to taper the chisel surface rearwardly from the cutting end in the direction of rotation of the bit, moving the bit and grinding wheel relative to each other to bring said half of the cutting end of the bit into contact with the grinding wheel whereby to grind said half to said predetermined depth, separating the bit and grinding wheel, rotating the bit 180° on its longitudinal axis, positioning the bit and grinding wheel relative to each other with the other of said halves of the cutting end disposed for registration with the matching surface of the grinding wheel in such manner that the cutting surfaces to be formed on the bit will be oriented properly on the bit upon completion of grinding the bit to said predetermined depth, and with the longitudinal axis of the bit fixed obliquely with respect to the tangent of the grinding wheel at their point of intersection and in the direction to taper the chisel surface rearwardly from the cutting end in the direction opposite the direction of rotation of the bit, and moving the bit and grinding wheel relative to each other to bring said half of the cutting end of the bit into contact with the grinding wheel whereby to grind said half to said predetermined depth.

4. The method of claim 3 including the additional steps of separating the bit and grinding wheel, rotating the bit substantially 90° on its longitudinal axis, positioning the bit and grinding wheel relative to each other with the longitudinal axis of the bit disposed obliquely with respect to the tangent of the grinding wheel at their point of intersection and in the direction to clear the cutting lips from the grinding wheel during grinding of the remaining quadrants of the center spur, moving the bit and grinding wheel relative to each other to engage and grind one of said quadrants of the center spur with the grinding wheel, separating the bit and grinding wheel, rotating the bit 180° on its longitudinal axis, and moving the bit and grinding wheel relative to each other to engage and grind the remaining quadrant of the center spur with the grinding wheel.

5. Apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: said apparatus comprising a rotary grinding wheel having a grinding surface which includes an intermediate transverse chisel surface grinding portion and spaced diverging spur and cutting lip grinding portions, bit support means having a longitudinal axis and adapted to support a bit coaxially with said axis, means positioning the grinding wheel and bit support means relative to each other with said axis of the bit support means offset from the transverse portion of the grinding wheel whereby to position one of the halves of the cutting end of a bit at a time for registration with the said grinding surface of the grinding wheel, means positioning the grinding wheel and bit support means relative to each other with said axis of the bit support means disposed obliquely with respect to the tangent of the grinding wheel at the point of intersection of said axis and tangent in the direction to taper the chisel surface of a bit rearwardly from the cutting end in the direction opposite the direction of rotation of the bit, the last named positioning means including adjustable indexing means for varying said relative position of the grinding wheel and bit support means to accommodate both right and left-hand bits, and means supporting said grinding wheel and bit support means for relative movement toward and away from each other.

6. The apparatus of claim 5 wherein the adjustable indexing means comprises longitudinally spaced pairs of indexing detents on the bit support means and an arcuately adjustable indexing pin associated with each pair of said detents.

7. Apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: said apparatus comprising a rotary grinding wheel having a grinding surface which includes an intermediate transverse chisel surface grinding portion and spaced diverging spur and cutting lip grinding portions, bit support means having a longitudinal axis and adapted to support a bit coaxially with said axis, means positioning the grinding wheel and bit support means relative to each other with said axis of the bit support means offset from the transverse portion of the grinding wheel whereby to position one of the halves of the cutting end of a bit at a time for registration with the said grinding surface of the grinding wheel, means positioning the grinding wheel and bit support means relative to each other with said axis of the bit support means disposed obliquely with respect to the tangent of the grinding wheel at the point of intersection of said axis and tangent in the direction to taper the chisel surface of a bit rearwardly from the cutting end in the direction opposite the direction of rotation of the bit, means positioning the grinding wheel and bit support means relative to each other for orienting a bit in such rotation adjustment relative to the grinding wheel that the cutting surfaces to be formed on the bit will be oriented properly on the bit upon completion of grinding the bit to a predetermined depth, and means supporting said grinding wheel and bit support means for relative movement toward and away from each other.

8. The apparatus of claim 7 wherein the means for orienting the bit rotationally comprises holder means for securing the bit support means in a predetermined position of rotational and longitudinal adjustment, and apertured bit-receiving template means mounted on the holder means and having abutment means thereon arranged in a predetermined rotational position with respect to the rotational position of the bit support means, the abutment means being adapted to engage an edge of a wood bit defined by a flute of the latter.

9. The apparatus of claim 8 including adjustable stop means on the holder means adapted to engage a bit for controlling the longitudinal adjustment of the latter relative to the bit support means, whereby to control the depth to which a bit is to be ground.

10. The apparatus of claim 8 wherein the template means is arranged for reversible adjustment to accommodate right and left-hand bits.

11. Apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: said apparatus comprising a rotary grinding wheel having a grinding surface which includes an intermediate transverse chisel surface grinding portion and spaced diverging spur and cutting lip grinding portions, bit support means having a longitudinal axis and adapted to support a bit coaxially with said axis, means positioning the grinding wheel and bit support means relative to each other with said axis of the bit support means offset from the transverse portion of the grinding wheel whereby to position one of the halves of the cutting end of a bit at a time for registration with the said grinding surface of the grinding wheel, means positioning the grinding wheel and bit support means relative to each other with said axis of the bit support means disposed obliquely with respect to the tangent of the grinding wheel at the point of intersection of said axis and tangent in the direction to taper the chisel surface of a bit rearwardly from the cutting end in the direction opposite the direction of rotation of the bit, means supporting said grinding wheel and bit support means for relative movement toward and away from each other, adjustable control means limiting said relative movement toward each other whereby to control grinding of a bit to a predetermined depth, and means associated with the bit support means for orienting a bit in such rotational adjustment relative to the grinding wheel that the cutting surfaces to be formed on the bit will be oriented properly on the bit upon completion of grinding the bit to said predetermined depth.

12. The apparatus of claim 11 including adjustable means supporting the bit support means for locating said axis selectively at positions of rotation 180° apart while maintaining said oblique relationship, whereby selectively to position each half of a bit for grinding by the grinding wheel.

13. The apparatus of claim 11 including adjustable means positioning the grinding wheel and bit support means relative to each other with said axis of the bit support means fixed at selected oblique positions with respect to the tangent of the grinding wheel at the point of intersection of said axis and tangent.

14. In apparatus for grinding wood bits having a cutting end including a central forwardly projecting spur, a pair of diametrically opposed radially extending chisel surfaces depressed from the spur, end peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, bit support means mounted on the base member, the grinding wheel and bit support means being mounted for relative movement on a fixed line toward and away from each other, the bit support means having a longitudinal axis and being adapted to support a bit coaxially with said axis, the bit support means being arranged with its longitudinal axis offset from the transverse grinding portion of the grinding wheel whereby to position one of the halves of the cutting end of a bit for registration with the said grinding surface of the grinding wheel, the longitudinal axis of the bit support means being fixed obliquely with respect to the tangent of the grinding wheel at their point of intersection in the direction to taper the chisel surface of a bit rearwardly from the cutting end in the direction opposite the direction of rotation of the bit, adjustable control means limiting said relative movement toward each other whereby to control grinding of a bit to a predetermined depth, and means associated with the bit support means for orienting a bit in such rotational adjustment relative to the grinding wheel that the cutting surfaces to be formed on the bit will be oriented properly on the bit upon completion of grinding the bit to said predetermined depth.

15. In an apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, support means mounted on the base member for movement on a fixed line toward and away from the grinding wheel, bit retainer means mounted slidably on the support means for moving a bit on a fixed line toward and away from the grinding wheel, the bit retainer means having a longitudinal axis and being adapted to support a bit coaxially with said axis, the bit retainer means being arranged with its longitudinal axis offset from the transverse grinding portion of the grinding wheel whereby to position one of the halves of the cutting end of a bit for registration with the said grinding surface of the grinding wheel, the longitudinal axis of the bit retainer means being fixed obliquely with respect to the tangent of the grinding wheel at their point of intersection in the direction to taper the chisel surface of a bit rearwardly from the cutting end in the direction opposite the direction of rotation of the bit, control means limiting said relative movement toward each other whereby to control grinding of a bit to a predetermined depth, and means associated with the bit retainer means for orienting a bit in such rotational adjustment relative to the grinding wheel that the cutting surfaces to be formed on the bit will be oriented properly on the bit upon completion of grinding the bit to said predetermined depth.

16. In apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, bit support means mounted pivotally and movably on the base member for rotation on an axis substantially normal to the plane of the grinding wheel and for movement on a fixed line toward and away from the grinding wheel, respectively, locking means selectively engaging the support means for positioning the latter in predetermined fixed positions of rotation with respect to the grinding wheel, the bit support means having a longitudinal axis and being adapted to support a bit coaxially with said axis, the bit support means being arranged with its longitudinal axis offset from the transverse grinding portion of the grinding wheel whereby in one of said predetermined fixed positions of adjustments to position one of the halves of the cutting end of a bit for registration with the said grinding surface of the grinding wheel, the longitudinal axis of the bit support means being fixed obliquely with respect to the tangent of the grinding wheel at their point of intersection in the direction to taper the chisel surface of a bit rearwardly from the cutting end in the direction opposite the direction of rotation of the bit, the bit support means being arranged in another of said predetermined fixed positions of adjustment to position the longitudinal axis of the bit support means fixed obliquely with respect to the tangent of the grinding wheel at their point of intersection in the direction to clear the cutting lips of a bit from the grinding wheel during grinding of the remaining quadrants of the center spur, control means limiting said relative movement toward each other whereby to control grinding of a bit to a predetermined depth, and means associated with the bit support means for orienting a bit in such rotational adjustment relative to the grinding wheel that the cutting surfaces to be formed on the bit will be oriented properly on the bit upon completion of grinding the bit to said predetermined depth.

17. The method of grinding helically fluted bits having a cutting end provided with internally recessed cutting edges on the flutes, comprising orienting the bit on its rotational axis to align a predetermined point on a flute rearwardly of the existing cutting edge thereon with the surface of a grinding wheel, and while maintaining the bit against axial rotation moving the bit and grinding wheel relatively toward each other and grinding away the misaligned portion of the flute forwardly of the predetermined point.

18. Apparatus for grinding helically fluted bits having a cutting end provided with internally recessed cutting edges of the flutes, said apparatus comprising a rotary grinding wheel, bit support means having a rotational axis, means orienting the bit support means rotationally with respect to the grinding wheel, and means orienting a bit rotationally in the bit support means for aligning a predetermined point on a flute rearwardly of the existing cutting edge thereon with the surface of the grinding wheel, and operating means for moving the bit support means and grinding wheel relatively toward each other for grinding away the misaligned portion of the flute forwardly of the predetermined point.

19. The apparatus of claim 18 wherein the means for orienting the bit rotationally comprises holder means for securing the bit support means in a predetermined position of rotational and longitudinal adjustment, and apertured bit-receiving template means mounted on the holder means and having abutment means thereon arranged in a predetermined rotational position with respect to the rotational position of the bit support means, the abutment means being adapted to engage an edge of a bit defined by a flute of the latter.

20. The apparatus of claim 19 including adjustable stop means on the holder means adapted to engage a bit for controlling the longitudinal adjustment of the latter relative to the bit support means, whereby to control the depth to which a bit is to be ground.

21. The apparatus of claim 19 wherein the template means is arranged for reversible adjustment to accommodate right and left-hand bits.

22. The apparatus of claim 18 including adjustable means supporting the bit support means for locating said axis selectively at positions of rotation 180° apart, whereby selectively to position each half of a bit for grinding by the grinding wheel.

23. The apparatus of claim 18 including adjustable means positioning the grinding wheel and bit support means relative to each other with said axis of the bit support means fixed at selected oblique positions with respect to the tangent of the grinding wheel at the point of intersection of said axis and tangent.

24. The apparatus of claim 18 including means positioning the grinding wheel and bit support means relative to each other with said axis of the bit support means disposed obliquely with respect to the tangent of the grinding wheel at the point of intersection of said axis and tangent in the direction to taper the chisel surface of the cutting edge of a bit rearwardly from the cutting end in the direction opposite the direction of rotation of the bit.

25. The apparatus of claim 24 wherein the positioning means includes adjustable indexing means for varying said relative position of the grinding wheel and bit support means to accommodate both right and left hand bits.

26. The apparatus of claim 25 wherein the adjustable indexing means comprises longitudinally spaced pairs of indexing detents on the bit support means and an arcuately adjustable indexing pin associated with each pair of said detents.

References Cited in the file of this patent

UNITED STATES PATENTS

| | | |
|---|---|---|
| 2,237,974 | Wainwright | Apr. 8, 1941 |
| 2,275,483 | Parker | Mar. 10, 1942 |
| 2,411,972 | Melin | Dec. 3, 1946 |
| 2,446,105 | Polk | July 27, 1948 |